UNITED STATES PATENT OFFICE.

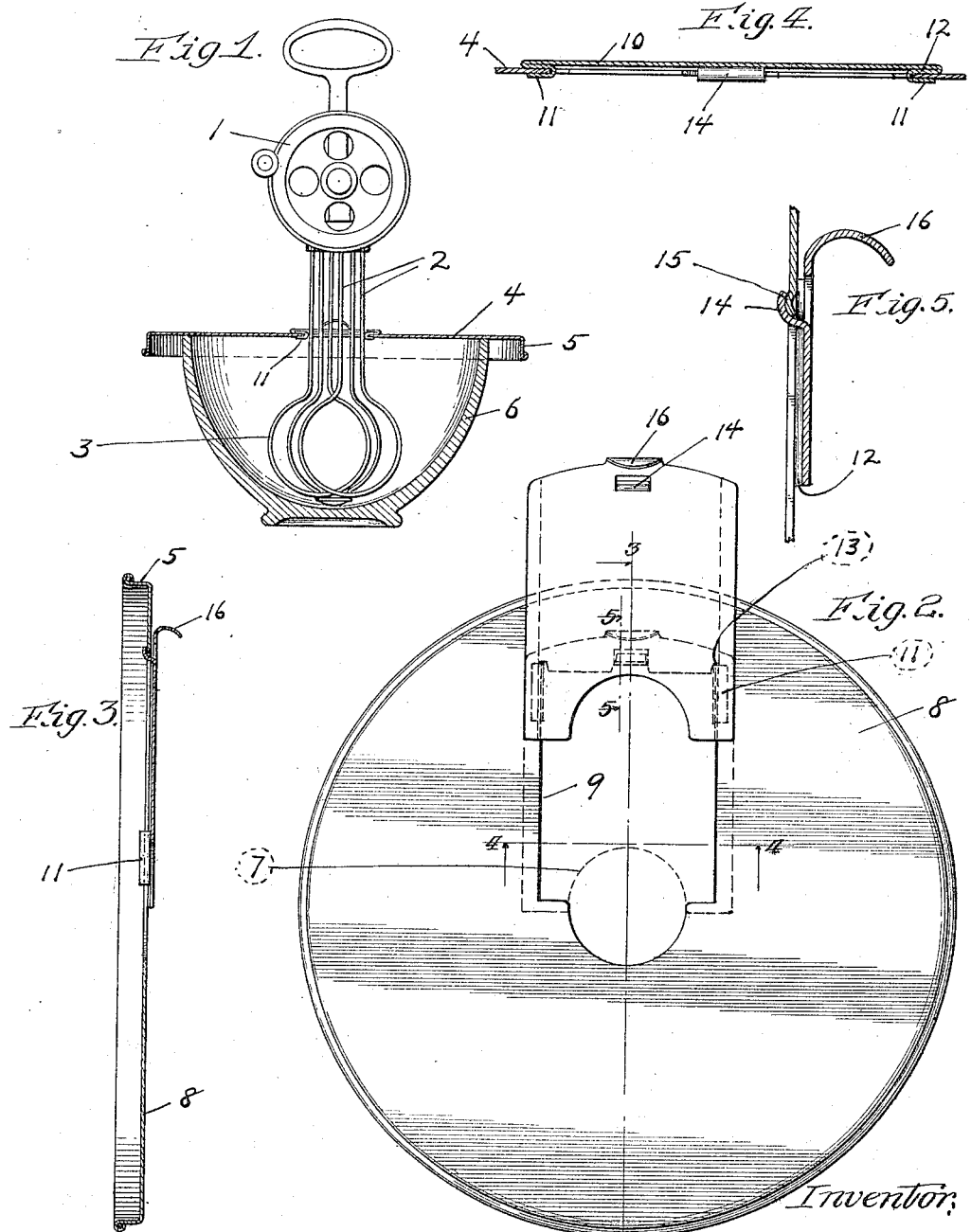

CHARLES A. VIDINGHOFF, OF CHICAGO, ILLINOIS.

SPLASH-GUARD FOR EGG-BEATERS OR CREAM-WHIPPERS.

1,179,984.     Specification of Letters Patent.     Patented Apr. 18, 1916.

Application filed April 16, 1915. Serial No. 21,707.

*To all whom it may concern:*

Be it known that I, CHARLES A. VIDINGHOFF, a citizen of the United States, residing at Chicago, in the county of Cook and State of Illinois, have invented certain new and useful Improvements in Splash-Guards for Egg-Beaters or Cream-Whippers; and I do hereby declare the following to be a full, clear, and exact description of the invention, such as will enable others skilled in the art to which it apertains to make and use the same.

My invention relates to a guard or cover for use in connection with a bowl or other vessel in which a beater or whipper is used for forcibly beating eggs, cream or the like. In using implements of this kind, considerable care has to be exercised to prevent splashing the liquid and frothy contents beyond the edges of the vessel, hence it is customary to manipulate egg beaters or cream whippers at a speed far below that at which they are most effective. To overcome this objection, such stirrers have been offered on the market mounted in jars or casings specially built around them, but such casings are usually hard to clean and will not adapt themselves to the varying quantities of the food materials which need to be subjected to a violent treatment. Moreover, the beating or stirring implement often cannot be as effectively manipulated when mounted in a jar as it can when handled by itself.

My invention aims to provide a splash-guard which may readily be interposed between the handle and beater portions of an ordinary stirring implement, such as a geared egg-beater, and which will act as an effective cover for the vessel within which the said beating portion is manipulated, thereby preventing the violently agitated liquid or semi-liquid material from splashing either out of the vessel or upon the handle portions of the implement.

More specifically, my invention aims to provide a splash-guard for this purpose which may be instantly attached to vessels of varying shapes and sizes: which may instantly be applied to, or detached from, the beating or stirring implement: which will afford a vessel-cover normally presenting only a sufficiently large opening to permit the actuating of the shank of the beating implement therethrough, but which will readily permit the said opening to be enlarged to a size ample for passing either the beater end or the handle end of the implement through the same, in which the means for adjusting the size of the said opening will be securely interlocked when the opening is contracted, but readily manually unlatched: in which an impinging of the rotating parts against the guard device will tend to lock the said contracting means more firmly, rather than to unlatch the same: in which the guard or cover can readily be raised for inspecting the contents of the vessel: and in which the relatively movable parts of the guard or cover will be normally rigidly interlocked, cheaply constructed and automatically guided.

While the appliance of my invention may be used with implements of various kinds and types, it is particularly adapted for use with geared egg-beaters of the socalled "Dover" type and is shown in this connection in the accompanying drawings, in which—

Figure 1 is a vertical section through a splash-guard and a bowl when being used with such an egg-beater. Fig. 2 is an enlarged plan view of the splash-guard of Fig. 1. Fig. 3 is a vertical section through Fig. 2. Fig. 4 is an enlarged fragmentary section through Fig. 2 along the line 4—4. Fig. 5 is an enlargement of the handle portion of the section of Fig. 3.

In carrying out my invention for use with a beating implement having a geared handle portion 1 connected by rotatable shank elements 2 to a beater portion 3, I preferably use a guard disk 4 having at its periphery a depending flange 5 adapted to overhang the edges of a bowl 6 of ordinary size. The disk 4 has at or near its center an aperture 7 slightly larger than the diameter of the shank portion 2 of the beater and hence adapted to permit the ready rotation of the said shank when passing through the said aperture. However, instead of making the guard of a single piece, I construct it of a main element 8 having an eccentric opening 9 of sufficient size to permit the beater end (or the handle end) of the beating implement to pass through the same, and mount upon this main element an auxiliary element 10 normally covering a portion of the said opening so as to contract the same to the aperture 7. The arrangement of the cover or guard elements for effecting this contracting of the opening when they are relatively moved in one direction, and for correspondingly enlarging the opening when the elements are relatively moved in the opposite direction, may be effected in many different ways. For example, the opening 9 in the main guard member 4 may have a pair of parallel sides extending toward the periphery of the guard and acting as guides for a pair of tongues 11 formed upon the auxiliary member 10 and respectively underhanging the said sides of the opening, as shown in Figs. 2 and 4. To stiffen the auxiliary members and to avoid sharp edges upon the latter, this member preferably has each lateral edge portion folded under itself into a guide strip 12, from which strips the respective tongues 11 extend at points sufficiently near the inner end of the auxiliary member to engage shoulders 13 at the inner end of the eccentric opening 8 for stopping the movement of the auxiliary member in one direction. When the auxiliary member has been moved until thus stopped, a latch tongue 14 (which had been sliding on the upper surface of the main guard member) drops into the outer end of the opening 8, and upon a subsequent motion of the auxiliary guard member in the opposite direction, this tongue snaps under the portion 15 of the main member situated between the periphery of the latter and the outer end of the opening 8. To make this latching more positive, I preferably arch the tongue 14 and indent the part 15 close to the edge of the said opening, so as to form the spring catch as shown in Fig. 5. I also preferably indent the outer end of the opening 8 with a recess having sloping sides laterally engaging the latch tongue 14 and coöperating with the guide tongues 11 to hold the auxiliary member against motion in any direction. Consequently, the auxiliary or sliding part of the guard when thus interlocked will be rigid with the main member, thus affording an effective splash-guard when the beater or stirrer is actuated. Moreover, any impact of the rotating shank against the concave edge of the auxiliary member will only tend to force the latter more energetically into its latching position.

Since the contracted aperture is considerably smaller than the beater portion of the implement with which the guard is used, the whole guard may readily be raised by lifting the beater, thereby permitting the contents of the bowl to be examined. Or, by manually unlatching the sliding auxiliary part (which is easily done by first moving this toward the shank by the handle 16 when retracting it), the opening may be enlarged and the beater portion lifted out through it. Moreover, it will be evident from Fig. 1 that my appliance can readily be used with vessels of varying diameters and that in case of too violent an agitation, the flange 5 will engage the outer edge of the vessel to prevent the guard or cover from being slid off the vessel. To insure a proper operation of the latch, I preferably make at least one of the guard members of resilient material. However, I do not wish to be limited to this or other details of the construction herein disclosed, it being obvious that the same might be modified in many ways without departing from the spirit of my invention.

I claim as my invention:

1. A splash-guard of the class described comprising a substantially flat circular, and peripherally flanged main member having an opening therein, and an auxiliary member movable with respect to the main member to cause the former normally to cover a portion of said opening, said auxiliary member having guide tongues lapped over opposite lateral edges of said opening, said tongues adapted to engage the respective end walls of said opening to limit the movement of said auxiliary member in opposite directions.

2. A splash-guard of the class described, comprising a disk having a perforation substantially radial thereof, a cover member movably carried by the disk and normally covering all but a round part of the perforation central of the disk, said cover member having integral therewith a latch tongue riding upon the disk when the cover member is being moved to uncover a larger part of said perforation, said tongue being normally snapped under a portion of the disk to latch the said member in its normal position with respect to the disk.

3. The combination with a beating implement having a beater portion larger in diameter than its shank, of a splash-guard comprising a light and substantially flat main member having an opening larger in section than the said beater portion, and an auxiliary member mounted upon the main member and movable with respect thereto; the said members normally presenting opposed semi-circular formations coöperating to border a contraction of the said opening to a size larger than said shank but smaller than said beater portion; the said members equipped with coöperating formations fast upon the respective members and normally holding the same rigidly interlocked in their said normal relation, thereby causing said members to present relatively rigid portions adjacent to said contracted opening and simultaneously engaged by said beater portion upon a lifting of the beater.

CHARLES A. VIDINGHOFF.

Copies of this patent may be obtained for five cents each, by addressing the "Commissioner of Patents Washington, D. C."